March 21, 1939.  W. G. L. SMITH  2,151,307

REINFORCED HOSE AND METHOD OF CONSTRUCTING THE SAME

Filed Jan. 17, 1938

INVENTOR
WALTER G. L. SMITH
BY
HARRIS, KIECH, FOSTER & HARRIS

ATTORNEYS

Patented Mar. 21, 1939

2,151,307

UNITED STATES PATENT OFFICE 2,151,307

REINFORCED HOSE AND METHOD OF CONSTRUCTING THE SAME

Walter G. L. Smith, Los Angeles, Calif.

Application January 17, 1938, Serial No. 185,252

9 Claims. (Cl. 154—4)

My invention relates to the oil well drilling art. The particular features of my invention involve the provision of an efficient type of "rotary hose", through which "rotary mud" is conducted from a stand pipe into the drill string during drilling operations, for the purpose of lubricating the drilling bit at the bottom of the well. During drilling operations, it is necessary to periodically connect additional sections of drill pipe to the string of drill pipe in the well. This necessitates the provision of a flexible rotary hose connection between the stationary stand pipe and the traveling swivel which supports the drill pipe at various levels. Further, it is essential; in addition to having sufficient flexibility, that the rotary hose be capable of withstanding the tremendous internal pressures necessary to force "rotary mud" through the drill pipe and through the lubricating openings in the bit attached thereto at the bottom of a well.

Reinforced rotary hose has been made prior to this time by utilizing flat woven wire, in ribbon form, molded into the hose in a manner somewhat similar to the present disclosure, but the use of this type of reinforcing is not satisfactory due to the inherent tendency for the woven wire ribbon to stretch. This tendency results in insufficient lateral resistance of the walls of the hose under internal compression.

Twisted wire cables, when used as reinforcing for such a hose, afford more resistance to lateral distortion of the hose under pressure and also afford greater flexibility. Attempts have been made in the past to utilize overlapping wrappings of twisted wire cable for such a purpose, but the practice has been practically given up as impractical due to the difficulty of handling the cable during the manufacture of the hose. In other words, in such past attempts to utilize twisted wire cable, the same cable was used for wrapping the hose in both a right and left spiral. This led to the difficulty that, although the cable could be easily wrapped in one direction, it would kink and would not properly feed through the machine utilized in applying the cable to the hose when an attempt was made to spiral the cable around the hose in the opposite direction.

It is therefore a particular object and a feature of my invention to provide a reinforced rotary hose and a method of making same which includes the provision of a twisted wire cable which is wrapped around a fabricated hose in a spiral, and a second wire cable twisted in the opposite direction and overlapping the first cable in a cross-spiral in the opposite direction, the rotary direction in which each cable is wound around the hose being opposite to the direction of the cable twist.

Twisted wire cables, of the character used in my invention and illustrated in the accompanying drawing, have a natural tendency to untwist if the cable is formed in a coil or spiral in the same direction. In other words, if a right-twist cable is coiled to the right, or spirally wrapped about an object in a rightward direction, it tends to untwist. This is particularly true if longitudinal stress is applied to the cable. On the other hand, a right-twist cable, if it is coiled leftwardly, or is wrapped in a spiral around an object in a leftward direction, will tend to twist tighter, thus definitely resisting elongation. The same premise naturally applies to a left-twist cable spiralled in a rightward direction.

It is therefore another object of my invention to provide a reinforced cable, for the purpose disclosed, having a right-twist wire cable wrapped therearound in a leftward spiral and having a left-twist wire cable overlapping the right-twist cable in a cross-spiral in a rightward direction.

Naturally, the method of producing such a rotary hose is a vital factor in my inventive concept, as will be brought forth in the following part of the description.

It is also another object of my invention to provide a method of producing a reinforced hose of the type described, which includes the use of an inner tube of uncured rubber and an outer covering of fabric, and then curing the same by suitable means in order to provide definite lateral resistance to deformation, after which a right-twist wire cable is wrapped spirally around the hose in a leftward spiral, and a left-twist wire cable is wrapped over the right-twist cable in a rightward spiral.

It is also another object of my invention to embed the cables mentioned in the above paragraph in rubber and to subsequently bind the rubber by curing, so that a solid body of rubber substantially completely surrounds the cables and fills the interstices therebetween.

The method of accomplishing the results outlined above, which are important features of my invention, will be fully explained in the following part of the specification, which should be read in connection with the accompanying illustrative drawing.

In the practice of my method of producing the reinforced hose illustrated, which in itself embodies novel features of invention as an article of manufacture, I first provide an inner uncured rubber tube 11, over which is wrapped a plurality of layers of fabric, or rubberized fabric 12, to form a fabricated hose 13.

The hose 13 is then cured, or partially cured, as by heat treating, so that it will have a definite resistance to lateral deformation.

Figure 1:
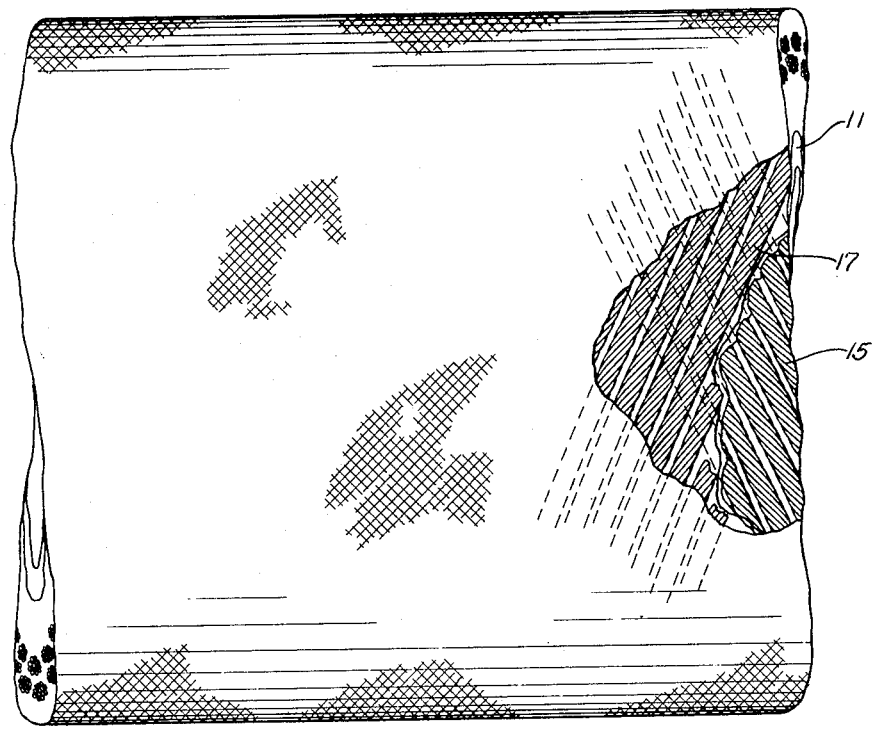
Fig. 1 is a side view of a fragment of the rotary hose embodying the features of my invention, and having portions thereof broken away to illustrate the manner in which the right-twist and left-twist cables are spirally wrapped around the hose in overlapping relationship.
Figure 2:
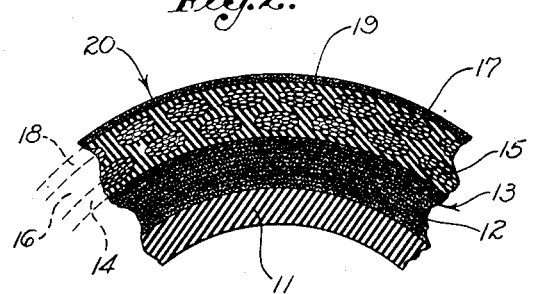
Fig. 2 is a fragmentary sectional view illustrating the manner in which the hose is produced according to my novel method.

An inner wrapping of uncured rubber, as indicated by the dotted lines 14 in Fig. 2, is then applied to cover the fabricated hose 13, and then a twisted wire cable is wrapped around the rubber covering 14 in a spiral extending the length of the hose, for instance in a leftward spiral as indicated at 15 in Fig. 1.

A second wrapping of uncured rubber, indicated by dotted lines 16 in Fig. 2, is applied over the cable 15, and then a second twisted wire cable 17 is wrapped around the rubber wrapping 16 in a cross-spiral with respect to the cable 15.

An outer wrapping of uncured rubber, as indicated by the dotted lines 18 in Fig. 2, is then applied over the cable 17.

Subsequently an outer covering 19 of fabric is applied over the rubber wrapping 18. A suitable compressive element, not shown, is then applied over the covering 19 with sufficient compressive force to deform the uncured rubber wrappings 14, 16, and 18 so that they will substantially fill the interstices between the cables 15 and 17. The hose is then further cured by suitable heat treatment to bind the rubber wrappings 14, 16, and 18 together in a solid mass of cured rubber 20, substantially completely surrounding the cables 15 and 17. By this method the mass of rubber, after curing, is also bonded with the fabric wrapping 12 and the outer fabric wrapping 19.

After the hose is cured by suitable means, the compressive element is removed.

As before explained, the cable which is spiralled in a leftward direction, for instance the cable 15, is a right-twist cable. By this I mean that the wires forming the cable are twisted clockwise when viewing the end of the cable. The overlapping cable, such as the cable 17, in order to carry out an important function of my invention, should then be a left-twist cable and should be spiralled around the hose in a rightward direction. By the term "left-twist cable" I intend to convey the converse of the term "right-twist" as used above. In other words, a left-twist cable, as here used, is one in which the wires forming the cable are twisted anti-clockwise when viewing the end of the cable. Such an arrangement, of a right-twist cable spiralled leftwardly and an overlapping left-twist cable spiralled rightwardly, or vice versa, increases the resistance of the hose to internal pressure due to the fact that longitudinal stress placed on the cable tends to twist the cables tighter.

It will be seen that my invention provides a new article of manufacture as well as a method of producing the same. I am aware that the article could be utilized as and for the purpose set forth without carrying on all of the steps of the method described in the specification, and that certain steps of the method disclosed could be used to produce a usable rotary hose, or the like, which would not embody all of the elements of my article of manufacture as disclosed. Therefore, the scope of my invention should not be interpreted by the illustrative drawing, nor the description thereof, but solely by the appended claims.

I claim as my invention:

1. A method of constructing reinforced hose, which includes the steps of: wrapping a right-twist wire cable in a leftward spiral around a fabricated hose; and wrapping a left-twist wire cable in a rightward spiral around said hose.

2. A method of constructing a reinforced hose, which includes the steps of: providing an uncured rubber hose; wrapping said uncured hose with a plurality of layers of fabric; curing said fabric wrapped hose sufficiently to provide a definite resistance to lateral pressure; wrapping a right-twist wire cable in a leftward spiral around said hose; wrapping a left-twist wire cable in a rightward spiral around said hose; and further curing said hose.

3. A method of constructing a reinforced hose, which includes the steps of: providing an uncured rubber hose; wrapping said uncured hose with a plurality of layers of fabric; curing said fabric wrapped hose sufficiently to provide a definite resistance to lateral pressure; wrapping a right-twist wire cable in a leftward spiral around said hose; wrapping a left-twist wire cable in a rightward spiral around said hose; covering said spiralled cables and filling the interstices between said cables with uncured rubber; and further curing said hose.

4. A method of constructing a reinforced hose, which includes the steps of: providing an uncured rubber hose; wrapping said uncured hose with a plurality of layers of fabric; curing said fabric wrapped hose sufficiently to provide a definite resistance to lateral pressure; wrapping a sheet of uncured rubber around said fabric wrapped hose; wrapping a right-twist wire cable in a leftward spiral over said sheet of uncured rubber; wrapping a second sheet of uncured rubber over said right-twist cable; wrapping a left-twist wire cable in a rightward spiral over said second sheet of uncured rubber; wrapping a third sheet of uncured rubber over said left-twist cable; applying a compressive element over said third sheet of uncured rubber so that said sheets of rubber are deformed to substantially fill the interstices between said cables; and further curing said hose to effect a permanent bond of the rubber substantially surrounding said cables.

5. A method of constructing a reinforced hose, which includes the steps of: providing an uncured rubber hose; wrapping said uncured hose with a plurality of layers of fabric; curing said fabric wrapped hose sufficiently to provide a definite resistance to lateral pressure; wrapping a sheet of uncured rubber around said fabric wrapped hose; wrapping a right-twist wire cable in a leftward spiral over said sheet of uncured rubber; wrapping a second sheet of uncured rubber over said right-twist cable; wrapping a left-twist wire cable in a rightward spiral over said second sheet of uncured rubber; wrapping a third sheet of uncured rubber over said left-twist cable; wrapping an outer covering of fabric over said third sheet of uncured rubber; applying a compressive element over said outer covering so that said sheets of rubber are deformed to substantially fill the interstices between said cables; further curing said hose to effect a permanent bond of the deformed rubber sheets substantially surrounding said cables; and then removing said compressive element.

6. As an article of manufacture, a reinforced hose including: an inner rubber tube; a wrapping of fabric around said tube; a right-twist wire cable wrapped in a leftward spiral over said fabric; a left-twist wire cable wrapped in a rightward spiral over said fabric; and an outer covering of fabric over said cables.

7. As an article of manufacture, a reinforced hose including: an inner rubber tube; a wrapping of fabric around said tube; a right-twist wire cable wrapped in a leftward spiral over said fabric; a left-twist wire cable wrapped in a rightward spiral over said fabric, said cables being embedded in and substantially surrounded by rubber; and an outer covering of fabric embedding and substantially surrounding said cables.

8. A method of constructing reinforced hose, which includes the steps of: wrapping around a hose core in a first rotary direction a wire cable that is twisted in the opposite rotary direction; and then wrapping around said core and cable in said opposite direction a second cable that is twisted in said first rotary direction.

9. A method of constructing reinforced hose, which includes the steps of: wrapping around a hose core in a first rotary direction a wire cable that is twisted in the opposite rotary direction; then wrapping around said core and cable in said opposite direction a second cable that is twisted in said first rotary direction; covering said wound cable with uncured rubber; and curing said added rubber.

WALTER G. L. SMITH.